June 21, 1966   B. L. MANN   3,256,908
FLUID TRANSPORT SYSTEM
Filed Oct. 2, 1963   4 Sheets-Sheet 4
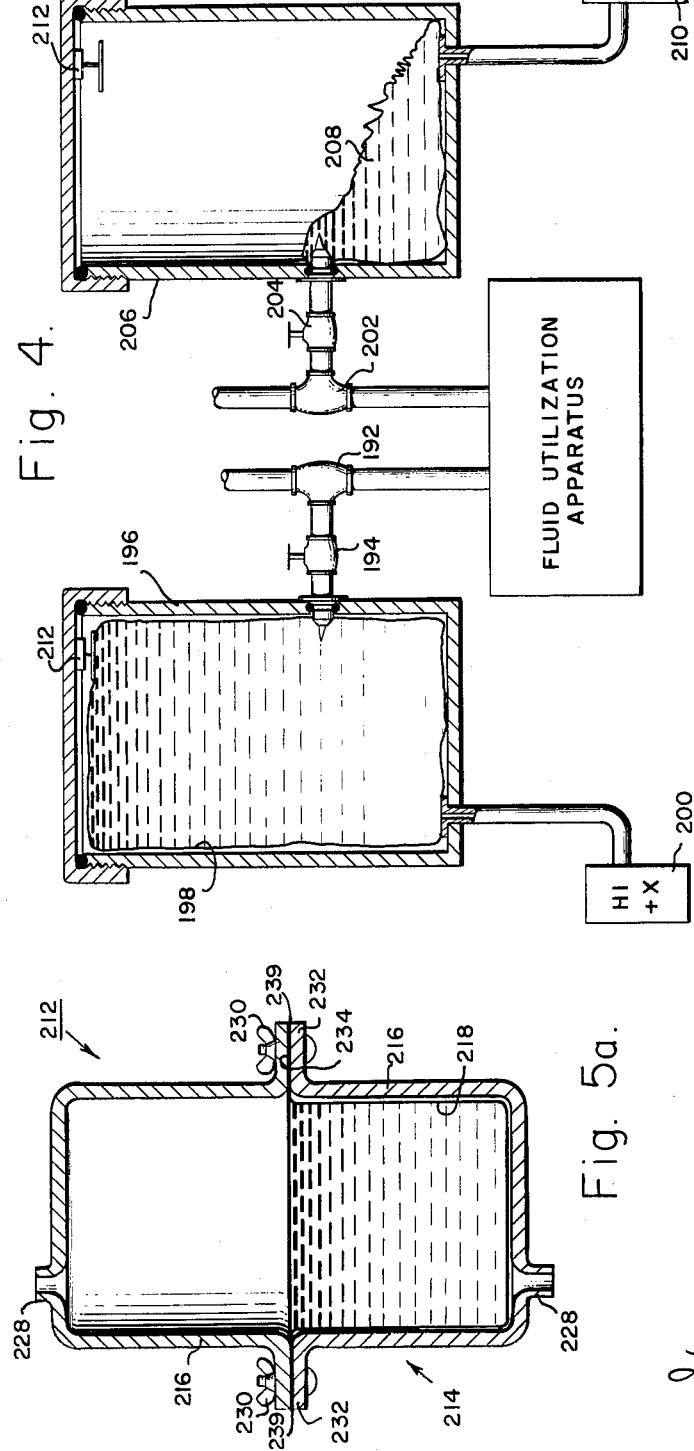
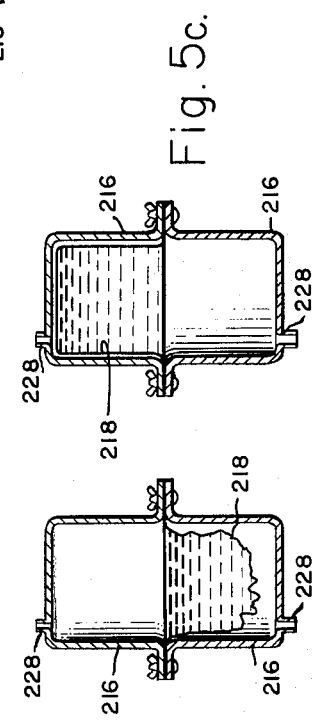
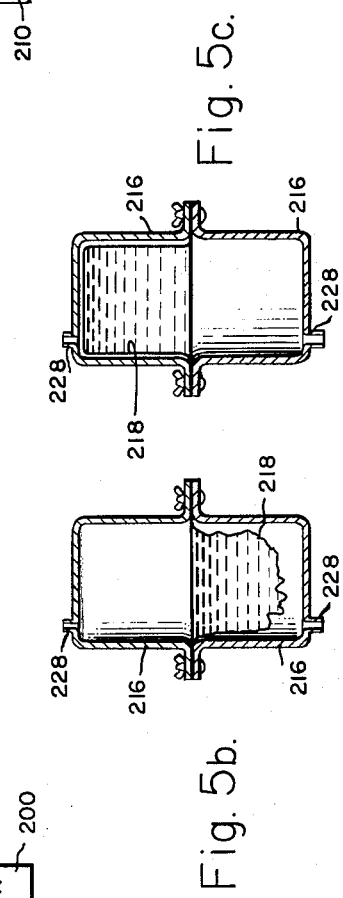
INVENTOR.
BERNARD L. MANN
BY
Leonard Golorz
ATTORNEY

United States Patent Office 3,256,908
Patented June 21, 1966

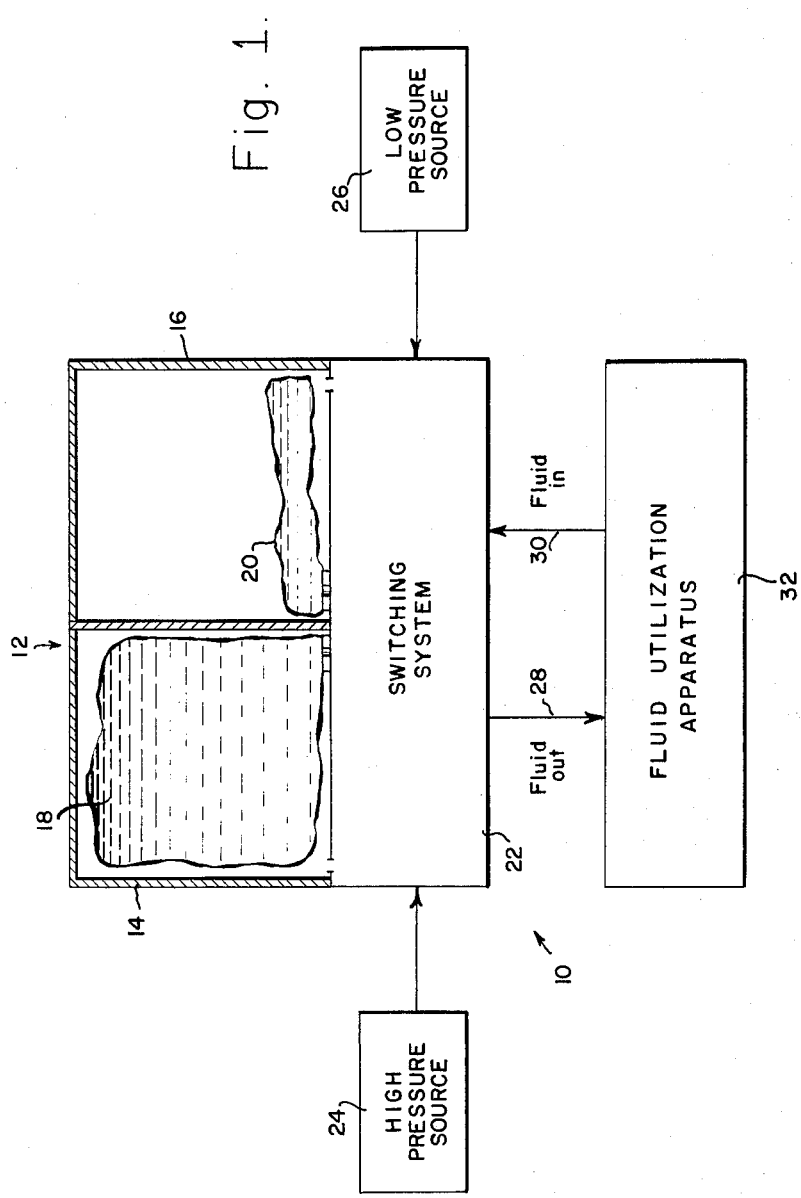

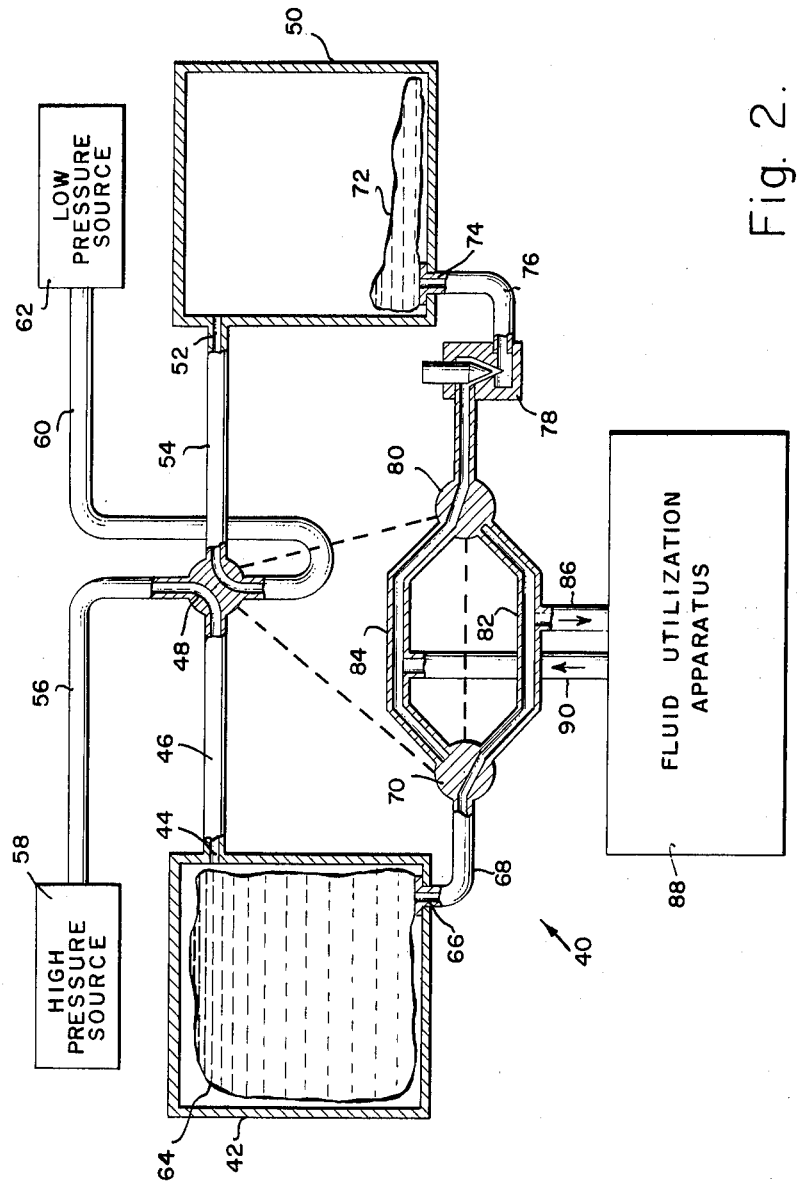

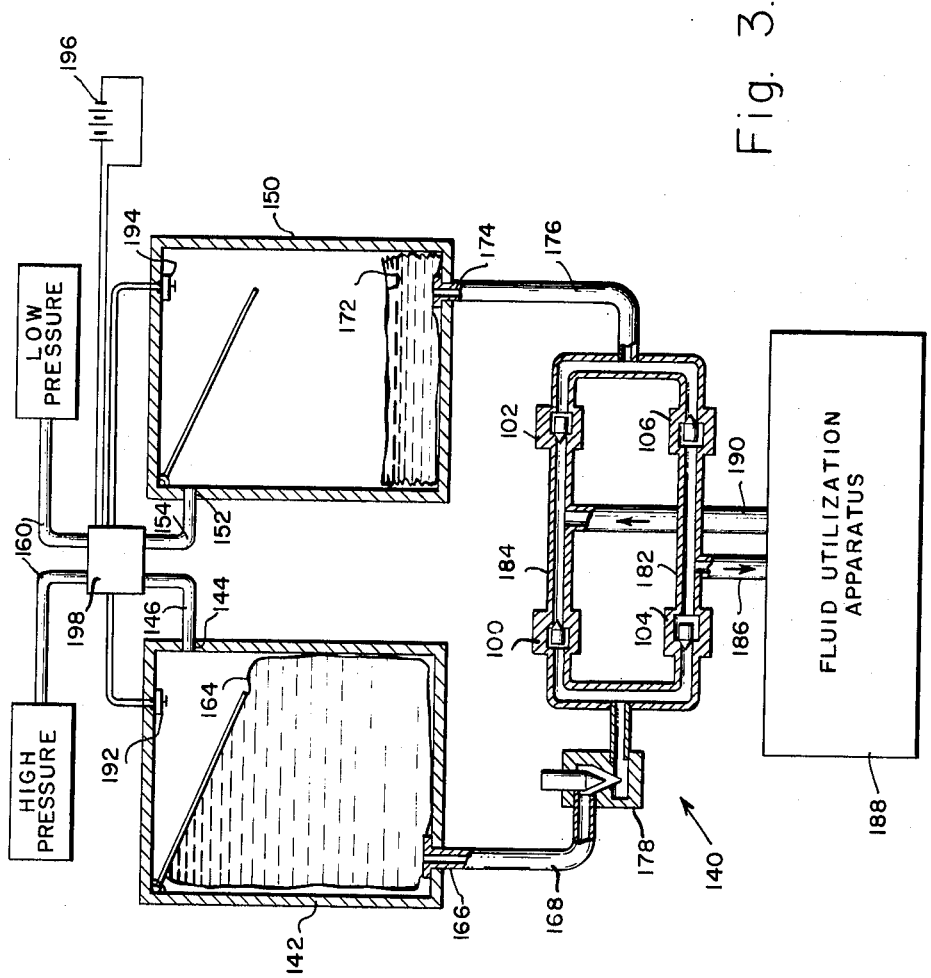

3,256,908
FLUID TRANSPORT SYSTEM
Bernard Lawrence Mann, Arcadia, Calif., assignor to Hycon Mfg. Company, Monrovia, Calif.
Filed Oct. 2, 1963, Ser. No. 313,349
6 Claims. (Cl. 137—571)

The present invention relates to fluid transport systems and, more particularly to a closed system for recirculating a fluid unidirectionally through a fluid utilization apparatus.

In the prior art, several systems can be found in which a first fluid system is used to provide, through flexible diaphragms or other sealing members, motive power to a second fluid system in which fluid is either transported or does work. For example, in the patent to Karl Westlund, No. 2,740,259, there is shown an apparatus for converting gas pressure to hydraulic pressure. A rigid, outer vessel wholly contains an expansible inner vessel and each is completely isolated from the other. The space between the inner and the outer vessels is filled with a hydraulic fluid and the inner vessel is connected to a source of a gas under high pressure. The pressurized gas causes the inner vessel to expand, expelling fluid from the space between the vessels with a force sufficient to actuate hydraulically operated equipment. Such a system is said to be "useful for supplying hydraulic power to isolated hydraulically operated equipment."

In still earlier patents, for example the patents to A. A. Canton, No. 1,780,336, and to J. R. Thompson No. 974,724, a bellows arrangement is shown in which fluids (including gases) are applied to one surface of the bellows, under pressures sufficient to change the volume of the bellows. Through the use of the bellows, force is transmitted to another fluid system so that the system supplying the energy does not mix with the system receiving the energy.

Although the prior art contemplates the use of independent fluid (or gas) systems, in which one fluid provides powering energy, and the other fluid is acted upon, there has been no provision for a sealed, low-cost pumping system.

There is often a need for an inexpensive and reliable system for pumping fluids from a first container to a second container and then to reverse the flow and pump the fluid back to the first container. In many of these systems it is necessary to isolate both fluids from each other and from the environment. Further, it may be desirable that the fluid be directed through a utilization apparatus in a single direction of flow, without regard to which of the containers is considered the source.

For example, it may be desirable to operate a fluid pump or turbine in a single direction and yet utilize a closed fluid system, alternately transporting fluid from the first container to the second and then back to the first, without reversing the direction of the turbine or pump. In such as system, external power apparatus drives the fluid from one container to the other, and it may be necessary to prevent mixing or contamination of the fluids either with each other or with the environment.

In highly specialized applications, such as the Rapid Film Processor described in the recently issued patent to P. C. Leighton et al. No. 3,060,829, a closed, fluid circulating system is desirable. In that patent, there is shown a device for developing film at high speeds in a portable system that is adaptable to be airborne. A "monobath" developing solution, one incorporating both developing and fixing chemicals, must be pumped through the apparatus which develops and fixes the film. Means are shown for pumping the monobath processing fluid through a closed recirculating system. From time to time, additional fluid is added, from a storage tank containing fresh solution. Periodically, the recirculating system is purged and fresh solution is introduced.

In other film processing systems, it may be possible to retain the monobath fluid and merely add additional concentrate to it while withdrawing spent or waste fluid from the system. In such an arrangement, it is unnecessary to completely purge the developing system and refill from source, but rather, by proper metering of the flows of concentrate into the system and of waste out of the system, the concentration of chemicals in the monobath can be kept substantially constant during operation of the processor, thereby assuring reasonable uniformity in the processing of the film.

In this and in other specialized applications, it is important to reduce the number and complexity of moving parts and power consuming elements in the recirculating system and to increase efficiency with a concomitant weight reduction. It is also desirable to have a sealed pumping system that can operate independently of the ambient pressure.

By the use of the term "fluid" it is intended that both gaseous and liquid systems be included as within the scope of the present invention. For example, air pressure or vacuum can be used to pump gases or liquids without fear of contamination. The present invention provides for a closed recirculating system for hydraulic or pneumatic fluids which furnishes unidirectional fluid flow in a given fluid utilization branch, without regard for the direction of the flow as between the primary fluid storage elements. In accordance with the present invention, a fluid pumping system is provided which can be adapted for utilization in the Rapid Film Processor of the patent identified above.

The primary supply of fluid is stored in one of two similar collapsible containers or sacs which are connected in parallel with a fluid utilization device. Each of the collapsible containers is placed entirely within an outer, fluid-tight, relatively rigid container which is completely independent of the sac and its contents. Means are provided for the application of a relatively high fluid pressure to the outer container which tends to collapse the sac. A second, empty, collapsible container or sac is connected to the fluid flow system and is entirely enclosed by a second outer, fluid tight, relatively rigid container, independent of the second sac. The second outer container is adapted to be connected to a source of relatively low fluid pressure. Valving means are provided for interchanging the applied fluid pressures to the two containers so that each collapsible sac is alternatively subjected to relatively high pressure when serving as a source and relatively low pressure when serving as a sink.

Connecting the two containers, there is a fluid system analog of the well known diode bridge of the electrical arts. A diode bridge is use to obtain a unidirectional flow of electrical current from an alternating current source. Here, in similar fashion, a plurality of unidirectional flow devices or valves are provided which either automatically, or in cooperation with the apparatus determining the application of pressure, assure that a first conduit of the bridge at all times is a source of fluid to the fluid utilization device and that a second conduit at all times receives fluid coming from the fluid utilization device. Such a bridge arrangement provides a unidirectional flow between the pumping system and the fluid utilization device without regard for the direction of fluid flow as between the collapsible sacs.

In operation, relatively high pressure is applied to the container holding the filled sac and relatively low pressure is applied to the container holding the empty sac. This pressure differential is transmitted to the fluid system causing fluid flow from the relatively full to the relatively empty sac collapsing the one sac and expanding the other. When the sac on the relatively high pressure side of the system is empty, the pressure connection must be reversed either manually or by an automatic system after which relatively high pressure is applied to the container now holding the full sac and relatively low pressure is applied to the container now holding the empty sac, thereby reversing the fluid flow as between the sacs. The use of the "bridge," however, "rectifies" the flow of fluid to the fluid utilization system and the fluid supply conduit and the fluid return conduit operate independent of the direction of fluid flow between the storage sacs.

In alternative embodiments, a "vacuum" is connected to the container holding the relatively empty sac and "normal," atmospheric pressure is applied to the container holding the full sac to create the pressure differential. In still other embodiments, a differential may be developed between two pressures, both of which can either be greater or less than the surrounding environment. A wide choice is available, so long as a pressure differential is created in the "driving" system which can be transmitted to the "driven" system.

In the special applications where the fluid utilization apparatus actually "exhaust" components of the fluid itself, leaving the volume substantially constant, it may be possible to extend the useful life of fluid by providing, in concentrated form, a source of those components which are "exhausted" or "used up" in the utilization apparatus. At the same time, means for draining off an equal volume of the "spent" liquid are provided to maintain a constant volume of fluid in the system. Such a modification would find utility in photographic processes as well as in plating systems, or, other systems which add a heavy concentration of contaminants. In the latter case, newly added liquid would be substantially free of any contaminants, and as fresh fluid is added, the heavily contaminated fluid is withdrawn from the system.

In such embodiments, third and fourth rigid containers and sacs are connected through restrictive valves to the driven fluid system. The one of the containers with the fluid to be added has its rigid container connected to a source of pressure relatively higher than that supplied to the first and second containers, and the other rigid container to hold the waste sac is connected to a source of pressure relatively lower than the low pressure source connected to the first and second containers. The actual connection can be made either to the unidirectional branches of the flow system, or to the fluid flow lines leading from the first and second collapsible containers.

In operation, the replenishing liquid is slowly metered into the fluid circulating system at a rate determined by the setting of the restrictive valve and the pressure differential existing between the fluid in the system at the point of entry and the pressure applied to the fluid container. If the fluid connection is made to one of the unidirectional flow lines, then a substantially constant amount of fluid is added at all times, since the pressure differential remains substantially constant between the higher pressure source and whatever pressure exists in the flowing line. Similarly, on the exhaust side, there is a constant pressure differential between the pressure in the system at that point and the lower pressure applied to the fourth rigid container.

If the fresh supply and waste sacs are connected to the fluid outlet of collapsible sacs, then the pressure differential will change, depending upon whether the sac is providing or receiving fluid. When the relatively high pressure is applied to the sac, relatively little replenisher fluid will flow in the system, but if the relatively low pressure source is applied, then a much greater pressure differential exists and the rate of flow of the replenisher is accordingly increased.

Under suitable operating conditions, the drop in fluid pressure existing between the collapsible sac and the unidirectional flow lines may be adequate to enable a flow of replenisher fluid into the system with the third container connected to the relatively high pressure source.

Accordingly, it is an object of the present invention to provide a sealed pumping system containing no wearing parts, nor moving seals.

It is still another object of invention to provide a sealed pumping system that is operable independent of the ambient pressures.

It is yet another object of invention to provide a closed recirculating pumping system for recirculating fluid, unidirectionally through a fluid utilization apparatus.

It is yet another object of invention to provide a completely automatic system for recirculating fluid unidirectionally through a fluid utilization apparatus.

It is yet another object of the present invention to provide a closed pumping system utilizing no moving seals.

It is yet another object of the invention to provide a sealed recirculating pumping system operable without a motor.

It is still another object of the invention to provide a sealed recirculating pumping system whereby fluid containers serve both as pump diaphragms and as storage reservoirs.

It is still an additional object of the present invention to provide a closed recirculating system for fluids in which the fluids are not exposed to environmental contamination.

It is still another object of the present invention to provide a closed recirculating system to which additional fluid may be added.

It is yet another object of the invention to provide a closed fluid recirculating system having no moving seals, the flow rate of which is widely adjustable.

It is yet another object of the present invention to provide a closed pumping system suitable for use with photographic film processors.

It is still another object of the present invention to provide a closed, fluid recirculating system having no wearing parts or moving seals and which is infinitely adjustable as to flow rate.

It is yet an additional object of the invention to provide, in conjunction with a pair of fluid containers functioning alternately as source and sink, a fluid equivalent to a bridge rectifier to convert an "alternating" flow of fluid to a "direct," unidirectional flow of fluid.

The novel features which are believed to be characteristic of the invention both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

FIG. 1 is a block diagram of a sealed pumping system according to the present invention;

FIG. 2 is an idealized view, partly in section, of a typical pumping system according to the present invention;

FIG. 3 is an alternative embodiment of the present invention capable of substantially automatic operation;

FIG. 4 is a block diagram of modifying elements, which, when added to the pumping system of the present invention, enable the addition of fluid to and the withdrawal of fluid from the system; and FIG. 5 made up of FIGS. 5a, 5b, and 5c, is an idealized view of an alternative rigid container and flexible sac suitable for use with the present invention.

Turning first to FIG. 1, there is shown, a fluid transport system 10 in accordance with the present invention. A fluid storage element 12 includes a first container 14 and a second container 16, both of rigid, fluid-tight construction, substantially isolated from each other. Wholly enclosed within the first container 14 is a first collapsible, fluid storage sac 18, and, similarly, in the second container 16 there is a second collapsible fluid storage sac 20. The sacs may be elastic or inelastic, it being understood that elasticity is not essential or even necessary. Each fluid storage sac is completely isolated from the container in which it is housed. Means (not shown) are provided for disassembling the rigid containers to gain access to the collapsible fluid storage sacs for removal and replacement purposes.

A switching system 22 connects to the rigid containers, the collapsible sacs and to sources of relatively high fluid pressure 24, and relatively low fluid pressure 26. The switching system 22 is adapted to selectively connect the high-pressure source 24 with one of the rigid containers and the low fluid pressure source 26 with the other of the rigid containers or to connect the low pressure source 26 to the one container and the high pressure source 24 to the other. The switching system 22 also includes a fluid outlet line 28 and a fluid intake line 30, here shown connected to a block designated fluid utilization apparatus 32, which may be the Rapid Film Processor, referred to above.

The switching system 22 also connects the fluid outlet line 28 with the collapsible storage sac acting as the source and connects the fluid intake line 30 to the collapsible sac acting as the sink.

In operation, assume initially that the first fluid storage sac 18 is full and therefore acts as the source. The second fluid storage sac 20 is empty and is the sink. The switching system 22 is then adjusted to connect the high pressure source 24 to the first container 14 and the low pressure source 26 to the second container 16. The fluid outlet line 28 is adjusted to connect to the first storage sac 18 or source and the fluid intake line is connected to the second storage sac 20 or sink. A pressure differential between the first and second containers 14, 16, equal to the difference between the pressure sources 24, 26, acts directly upon the fluid in the collapsible sacs causing a fluid flow from the first sac 18, through the fluid utilization apparatus 32, and into the second storage sac 20.

When the first fluid storage sac 18 is empty, the connections within the switching system 22 are manually or automatically reversed and the first sac 18 becomes the sink. The high pressure source 24 is then connected to the second container 16 and the low pressure source 26 is connected to the first container 14. The pressure differential is reversed and fluid flows from the second sac 20 back into the first sac 18. The switching system 22 also changes the fluid output and intake connections so that the source, now the second fluid storage sac 20, is connected to the fluid outlet line 28 and the fluid inlet line 30 is connected to the first fluid storage sac 18 which is the new sink.

Turning next to FIG. 2, there is shown, in greater detail, a preferred embodiment of a typical fluid transport system 40 that includes manually operated valves for switching the various connections. A first rigid container 42 of substantially fluid tight construction is provided with a single driving fluid orifice 44 which connects through a first pressure supply line 46 to a first driving fluid valve 48. A second rigid, fluid-tight container 50 also has a single driving fluid orifice 52 which connects through a second pressure supply line 54 to the first valve 48. The first valve 48 connects through suitable piping 56 to a relatively high-pressure driving fluid source 58, and through piping 60, to a relatively low-pressure driving fluid source 62.

The first driving fluid valve 48 has two operative positions. In one position, the high pressure source 58 is connected to the first rigid container 42 and the low pressure source 62 is connected to the second rigid container 50. In the second, alternative position, the high pressure source 58 is connected to the second rigid container 50 and the low pressure source 62 is connected to the first rigid container 42.

A first flexible, collapsible, driven fluid storage sac 64 is contained entirely within the first rigid container 42 and is isolated therefrom. A driven fluid coupling 66 connects the first sac, 64 through suitable tubing 68 to one port of a first driven fluid valve 70.

Wholly contained within the second rigid container 50 and isolated therefrom, is a second driven fluid storage sac 72 that connects through a fluid coupling 74 and suitable tubing 76 to one orifice of a regulating valve 78. The regulating valve 78 controls the driven fluid flow rate and is connected to one port of a second, driven fluid valve 80. Means are provided to disassemble the rigid containers 42, 50 so that sacs contained therein can be removed or replaced.

An outlet branch 82 is connected to a second port in each of the driven fluid valves 70, 80 and a second, inlet branch 84, is connected to a third port of the driven fluid valves 70, 80. The outlet branch 82 connects through a suitable fluid supply line 86, to the "intake port" of the fluid utilization apparatus 88 and, similarly, the inlet branch 84 is connected, through a suitable fluid supply line 90, to the "output" port of the fluid utilization apparatus 88.

It will be noted that two, independent, fluid systems co-exist in apparatus as shown and described. The driving system utilizes gases or liquids under pressure or vacuum and includes the high and low pressure sources 58, 62 and the first and second rigid containers 42, 50. The second, independent driven fluid circulating system is isolated from the pressure system only by reason of the flexible, collapsible fluid sacs or containers 64, 72 in which the fluid is stored. In operation, the driving fluid pressure differential acts directly upon the driven fluid since no pressure isolation is afforded by the flexible, collapsible fluid sacs. The driven fluid system includes the sacs, the valves and the branches leading to the fluid utilization apparatus.

The valve and branch interconnection, interposed in the driven fluid system, functions as a unidirectional flow apparatus. The driven fluid valves operate together, simultaneously connecting one of the fluid storage sacs to the inlet branch 84, and the other to the outlet branch 82. In the alternative position, the connections are reversed.

In normal operation, as illustrated in FIG. 2, the first fluid storage sac 64 is full and is the source. The second fluid storage sac 72 is empty and is the sink. In the inactive state, the regulating valve 78 completely blocks the flow of fluid and the driving fluid pressure connections are immaterial. To initiate operation of the apparatus, the first valve 48 is switched to the position shown in the drawing, connecting the high-pressure source 58 to the first rigid container 42 and the low pressure source 62 to the second rigid container 50. With this connection, the first, driven fluid valve 70 connects the first fluid storage sac 64 to the outlet branch 82 and the second, driven fluid valve 80 connects the second fluid storage sac 72 to the inlet branch 84. The regulating valve 78 is then adjusted for the desired rate of fluid flow. In this configuration, the pressure differential of the driving fluid is directly transmitted to the driven fluid in the system, and fluid flows from the first sac 64, through the outlet branch 82 and into the fluid utilization apparatus 88. Fluid from the fluid utilization apparatus 88 flows back to the inlet branch 84, and then through the regulating valve 78 into the second sac 72. This flow continues as long as the pressure differential continues between the first and second rigid containers 42, 50 fluid remains in the first sac 64 and the regulating valve 78 remains open.

When the first sac 64 is empty, and the second sac 72 is full, the valve connections must be reversed if the supply to the fluid utilization apparatus 88 is to be continued. This is accomplished by reversing the connections of the first valve 48 and changing the connections of the first and second driven fluid valves 70 and 80. High pressure source 58 is then coupled to the second container 50 and the low pressure source 62 is coupled to the first container 42, thereby reversing the pressure differential as between the second and the first rigid containers 50, 42.

Fluid then flows from the second sac 72 through the regulating valve 78 and then into the outlet branch 82 and fluid flowing into the inlet branch 84 goes to the first sac 64. After all of the driven fluid has been transferred from the second sac 72 to the first sac 64, the entire process can be repeated.

It will be noted that the functions of the outlet branch 82 and the inlet branch 84 are not changed or reversed so long as the positions of the first and second driven fluid valves 70, 80 are interlocked or otherwise coordinated with the position of the first valve 48. It is, therefore, desirable that some means be provided to control the operation of these three mechanisms to prevent inadvertent flow reversals to the fluid utilization apparatus 88. This can be accomplished by interconnecting moving members of the various valves so that a 90° clockwise (as viewed in FIG. 2) rotation of the first valve 48 causes a 120° clockwise rotation of the first and second driven fluid valves 70, 80.

Turning next to FIG. 3, there is shown an alternative embodiment of the present invention in which all switching functions are performed automatically so that fluid is continuously provided to a fluid utilization apparatus. In FIG. 3, the reference designations of FIG. 2, have been modified by the addition of a numeral 1 prefix, identify thereby similar elements. For example, the entire fluid transport system 40 of FIG. 2 is identified by the reference designation 140.

A substantially similar fluid transport system 140 incorporates two major changes, not found in the embodiment of FIG. 2. One involves the provision of automatic means for reversing the driving fluid pressure connections to the first and second rigid containers 142, 150, including a pair of snap-action switches 192, 194, installed in the first and second rigid containers 142, 150 respectively. The snap-action switches 192, 194 are connected between a source of electrical energy 196 and an automatic valve 198 which is functionally identical to the first valve 48 of the embodiment of FIG. 2. In a first position, the valve 198 connects the high pressure source 158 to the first container 142 and the low pressure source 162 to the second container 150. In the second position, the high pressure source 158 is coupled to the second container 150, and the low pressure source 162 is coupled to the first container 142.

The driven fluid flow system is also modified by the inclusion of a pair of T members in place of the driven fluid valves to form the parallel inlet and outlet branches, 182, 184 respectively. To regulate the direction of fluid flow in the branches, the inlet branch 184 includes first and second unidirectional flow valves 100, 102 which are connected, one on each side of the inlet fluid flow line 190, and are directed to permit the fluid to flow *toward* the collapsible sacs.

In operation, the driven fluid system operates as a hydraulic analog of an electrical rectifying bridge. When fluid flows from the first sac 164, it can only flow through the third valve 104 into the outlet branch 182. Similarly, fluid from the fluid utilization apparatus 188 flows through the inlet branch 184 and through the second valve 102 into sac 172. The fluid pressure on the first valve 100 prevents any leakage from the inlet branch 184. For oppositely directed pressure differentials, fluid flows from the second sac 172, through the fourth valve 106 and the outlet branch 182. From the inlet branch 184, back pressure closes the second valve 102 and fluid therefore flows through the first valve 100 to the first sac 164.

To achieve the alternative embodiments in which fresh fluid is added and waste fluid is withdrawn, the apparatus of FIGS. 2 and 3 can be modified by the addition of the elements shown in FIG. 4. For purposes of illustration, the system of FIG. 3 has been used as the basis for modification. In various alternative embodiments, a replenisher fluid can be introduced into the driven fluid system at either the output of the outlet branch 182 or between one of the sacs and the outlet branch 182. The corresponding connections for the waste fluid container are to the input to the inlet branch 184 or between the other of the sacs and the outlet branch 182.

In the specific embodiment of FIG. 4 and with reference to FIG. 3 a first T section 192 is provided to enable connection into the driven fluid system. Connected to the upright portion of the T is a first flow control valve 194 which meters the flow into the fluid system. A third rigid container 196 contains a third, collapsible fluid storage sac 198. The third container 196 is connected to a source of driving fluid pressure 200 which is nominally kept at a pressure equal to that of the relatively high pressure source 158 *plus* an additional increment of pressure, "X."

A second T section 202 is provided for connection with the driven fluid system and is coupled to a second flow control valve 204. The second valve 204 connects to a fourth rigid container 206 which wholly contains but is isolated from a fourth collapsible fluid storage sac 208 that can be used to draw off waste fluid. The fourth container 206 communicates with a source of low fluid pressure 210, that is maintained at a pressure equal to that of the low pressure source 162 *minus* the increment "X" of pressure.

The rigid containers 196, 206 are also capable of disassembly so that the flexible sacs within can be removed for repair or replacement. A new supply of fresh fluid could be stored in sealed collapsible sac which could, as a unit, be added to the system by installation in the third rigid container. Similarly, a fresh, empty collapsible sac could be connected into the fourth rigid container whenever the sac therein fills with waste or exhausted fluid.

With the scope of the present invention, an individual fluid sac could be provided with heavy plastic, membrane seals, which can be punctured by a tapered, sharpened, needle-like member, much in the fashion of cartridge-type fountain pens or venoclysis-type fluid infusion systems, in which container seals are penetrated at this time of use. Other varients would include threaded caps or snap-on fittings which are held in place.

In operation, of this embodiment, the first and second valves 194 and 204 are set to permit a slow transfer of fluid. The high pressure source 200 exerts a force sufficient to prevent back flow from the system. While the fluid entering the utilization apparatus 188 will be constantly enhanced by a slow infusion of fresh fluid, the exhausted or spent solution flowing back from the utilization apparatus will be partially tapped into the waste or exhaust container 208 at approximately the same rate of flow. A pressure switch 212, similar to the switches 192 and 194 (of FIG. 3) may be placed in the fourth container 206 to signal when the waste fluid sac 208 is nearly full. At that time, it will probably be necessary to replace the fresh fluid supply in the third container 196.

Turning finally to FIG. 5, which is made up of FIGS. 5a, 5b and 5c, there is shown an alternative form for a rigid container-collapsible sac combination 212. In those applications where it is not necessary to have an integral, collapsible sac in which liquids can be stored and transported independent of the rigid container, it is possible to provide a large rigid container 214 which is separable into two substantially identical sections 216 and which contains a completely flexible, fluid tight and impermeable membrane 218 of sufficient area to occupy at least half of the inner surface of the rigid container.

Such a membrane 218 can be made up of commercially available polyester films such as "Mylar" or "Saran." These films are strong, flexible, and have a relatively high resistance to bursting.

As shown, the rigid container 214 is completely symmetrical and either half 216 may be used for the driving fluid. An orifice 228 is provided at each end with a suitable fitting so that piping, tubing, or other conduits can be connected. As shown, a plurality of wing nuts 230 through flanges 232 secure the two halves 216 of the rigid container 214 together, and a peripheral rim 239 of the flexible film 218 serves as an adequate seal.

FIGS. 5b and 5c are added to show a transition from the configuration of FIG. 5a, which assumes a relatively higher fluid pressure in the upper half of the container, to the situation where the relatively higher pressure is applied to the lower half of the container.

This and other variations are within the scope of the present invention without departure therefrom.

What is claimed as new, is:

1. A fluid transport system for recirculating fluid bidirectionally between two containers and adapted to provide unidirectional fluid flow through a fluid utilization apparatus, the system comprising in combination:

a first, fluid tight, rigid container having a first and second chamber portion, each chamber portion having means adapted to connect to a different fluid source and flexible, diaphragm means attached inside said rigid container for separating and isolating said first chamber portion from said second chamber portion, said chamber portions being bounded by the inner surface of said rigid container and commonly sharing said diaphragm means, each of said chamber portions being adapted to hold a volume of fluid substantially equal to the entire volume of said rigid container, alternatively; a second, fluid tight, rigid container having a third and fourth chamber portion, each chamber portion having means adapted to connect to a different fluid source and flexible diaphragm means attached inside said second rigid container for separating and isolating said third chamber portion from said fourth chamber portion, said chamber portions being bounded by the inner surface of said second rigid container and commonly sharing said diaphragm means, each of said portions being adapted to hold a volume of fluid substantially equal to the entire volume of said rigid container, alternatively; first, driving fluid switching means connected to said rigid containers and adapted to connect to sources of driving fluid under relatively high pressure and relatively low pressure, said first fluid switching means having a first operating configuration for coupling said first container to the high pressure source and said second container to the low pressure source, and a second operating configuration for coupling said first container to the low pressure source and said second container to the high pressure source; and second, driven fluid switching means comprising a bridge having unidirectional flow means in each bridge arm connected to said rigid containers and adapted to circulate a driven fluid through unidirectionally a fluid utilization apparatus, said second fluid switching means having an outlet branch for providing fluid to the fluid utilization apparatus and an inlet branch for receiving fluid from the fluid utilization apparatus, said second fluid switching means having a first operating configuration corresponding to said first fluid switching means second configuration in response to pressure differential for connecting said first container to said outlet branch and said second container to said inlet branch, whereby an application of a driving fluid pressure differential between said first and second containers causes a flow of driven fluid between said first and second containers, and whereby said outlet branch and the relatively high pressure source are respectively connected to different chamber portions of the same one of said containers and the inlet branch and the low pressure source are respectively connected to different chamber portions of the same other of said containers.

2. A fluid transport system for recirculating fluid bidirectionally between two containers and adapted to provide unidirectional fluid flow through a fluid utilization apparatus, the system comprising in combination:

a first, fluid tight, rigid container having a first and second chamber portion, each chamber portion having means adapted to connect to a different fluid source and flexible, diaphragm means attached inside said rigid container for separating and isolating said first chamber portion from said second chamber portion, said chamber portions being bounded by the inner surface of said rigid container and commonly sharing said diaphragm means, each of said chamber portions being adapted to hold a volume of fluid substantially equal to the entire volume of said rigid container, alternatively;

a second, fluid tight, rigid container having a third and fourth chamber portion, each chamber portion having means adapted to connect to a different fluid source and flexible diaphragm means attached inside said second rigid container for separating and isolating said third chamber portion from said fourth chamber portion, said chamber portions being bounded by the inner surface of said second rigid container and commonly sharing said diaphragm means, each of said portions being adapted to hold a volume of fluid substantially equal to the entire volume of said rigid container, alternatively;

first, driving fluid switching means connected to said rigid containers and adapted to connect to sources of driving fluid under relatively high pressure and relatively low pressure, said first fluid switching means having a first operating configuration for coupling said first container to the high pressure source and said second container to the low pressure source, and a second operating configuration for coupling said first container to the low pressure source and said second container to the high pressure source;

second, driven fluid switching means connected to said rigid containers and adapted to circulate a driven fluid through a fluid utilization apparatus, said second fluid switching means having an outlet branch for providing fluid to the fluid utilization apparatus and an inlet branch for receiving fluid from the fluid utilization apparatus, said second fluid switching means having a first operating configuration corresponding to said first fluid switching means second configuration for connecting said first container to said outlet branch and said second container to said inlet branch; and a third, fluid tight, rigid container substantially identical to said first and second rigid containers and adapted to connect one of its chamber portions to a source of driving fluid at a pressure relatively higher than said relatively high pressure; means for connecting the other of its chamber portions to said second fluid switching means for supplying additional driven fluid to said system.

3. A fluid transport system for recirculating fluid bidirectionally between two containers and adapted to provide unidirectional fluid flow through a fluid utilization apparatus, the system comprising in combination:

a first, fluid tight, rigid container having a first and second chamber portion, each chamber portion having means adapted to connect to a different fluid source and flexible, diaphragm means attached inside said rigid container for separating and isolating said first chamber portion from said second chamber portion, said chamber portions being bounded by the inner surface of said rigid container and commonly sharing said diaphragm means, each of said chamber portions being adapted to hold a volume of fluid substantially equal to the entire volume of said rigid container, alternatively;

a second, fluid tight, rigid container having a third and fourth chamber portion, each chamber portion having means adapted to connect to a different fluid source and flexible diaphragm means attached inside said second rigid container for separating and isolating said third chamber portion from said fourth chamber portion, said chamber portions being bounded by the inner surface of said second rigid container and commonly sharing said diaphragm means, each of said portions being adapted to hold a volume of fluid substantially equal to the entire volume of said rigid container alternatively;

first, driving fluid switching means connected to said rigid containers and adapted to connect to sources of driving fluid under relatively high pressure and relatively low pressure, said first fluid switching means having a first operating configuration for coupling said first container to the high pressure source and said second container to the low pressure source, and a second operating configuration for coupling said first container to the low pressure source and said second container to the high pressure source;

second, driven fluid switching means connected to said rigid containers and adapted to circulate a driven fluid through a fluid utilization apparatus, said second fluid switching means having an outlet branch for providing fluid to the fluid utilization apparatus and an inlet branch for receiving fluid from the fluid utilization apparatus, said second fluid switching means having a first operating configuration corresponding to said first fluid switching means second configuration for connecting said first container to said outlet branch and said second container to said inlet branch; and a third rigid container substantially similar to said first and second rigid containers, means for connecting one of said third container chamber portions through a source of driving fluid under a pressure lower than said relatively low pressure; and means for connecting the other of said third container chamber portions to said second fluid switching means for withdrawing driven fluid from said transport system.

4. A fluid transport system for recirculating fluid bidirectionally between two containers and adapted to provide unidirectional fluid flow through a fluid utilization apparatus, said system comprising in combination:

a first, fluid tight, rigid container having means adapted to connect to a fluid source, a first flexible, fluid tight sac attached inside said rigid container for holding a volume of fluid substantially equal to the entire volume of said rigid container and means for transmitting fluid to and from said first sac; a second, fluid tight, rigid container having means adapted to connect to a fluid source, a second flexible fluid tight sac attached inside said second rigid container and isolated therefrom for holding a volume of fluid substantially equal to the entire volume of said second rigid container and means for transmitting fluid to and from said second sac; first, driving fluid switching means connected to said rigid containers and adapted to connect to sources of driving fluid under relatively high and relatively low pressures, said first fluid switching means having a first operating configuration for coupling said first container to the high pressure source and said second container to the low pressure source, and a second operating configuration for coupling said first container to the low pressure source and said second container to the high pressure source; and second, driven fluid switching means connected to said flexible sacs and adapted to circulate a driven fluid unidirectionally through a fluid utilization apparatus, said second fluid switching means comprising a bridge having unidirectional flow means in each bridge arm and having an outlet branch for providing fluid to the fluid utilization apparatus and an inlet branch for receiving fluid from the fluid utilization apparatus, said second fluid switching means having a first operating configuartion corresponding to said first fluid switching means first configuration in response to pressure differentials for connecting said first flexible sac to said outlet branch and said second flexible sac to said inlet branch, and a second operating configuration corresponding to said first fluid switching means second configuration in response to pressure differentials for connecting said second sac to said outlet branch and said first sac to said inlet branch, whereby an application of a driving fluid pressure differential between said first and second containers causes a flow of driven fluid between said first and second sacs, and whereby said outlet branch and the relatively high pressure source are always respectively connected to the interior and exterior of the sac of one of said containers automatically and the inlet branch and the low pressure source are always respectively connected automatically to the interior and exterior of the sac of the other of said containers.

5. A fluid transport system for recirculating fluid bidirectionally between two containers and adapted to provide unidirectional fluid flow through a fluid utilization apparatus, said system comprising in combination:

a first, fluid tight, rigid container having means adapted to connect to a fluid source, a first flexible, fluid tight sac attached inside said rigid container for holding a volume of fluid substantially equal to the entire volume of said rigid container and means for transmitting fluid to and from said first sac;

a second, fluid tight, rigid container having means adapted to connect to a fluid source, a second flexible fluid tight sac attached inside said second rigid container and isolated therefrom for holding a volume of fluid substantially equal to the entire volume of said second rigid container and means for transmitting fluid to and from said second sac;

first driving fluid switching means connected to said rigid containers and adapted to connect to sources of driving fluid under relatively high and relatively low pressures, said first fluid switching means having a first operating configuration for coupling said first container to the high pressure source and said second container to the low pressure source, and a second operating configuration for coupling said first container to the low pressure source and said second container to the high pressure source;

second, driven fluid switching means connected to said flexible sacs and adapted to circulate a driven fluid through a fluid utilization apparatus, said second fluid switching means having an outlet branch for providing fluid to the fluid utilization apparatus and an inlet branch for receiving fluid from the fluid utilization apparatus, said second fluid switching means having a first operating configuration corresponding to said first fluid switching means first configuration for connecting said first flexible sac to said outlet branch and said second flexible sac to said inlet branch, and a second operating configuration corresponding to said first fluid switching means second configuration for connecting said first sac to said outlet branch and said second sac to said inlet branch, whereby an application of a driving fluid pressure differential between said first and second containers causes a flow of driven fluid between said first and second sacs, and whereby said outlet branch and the relatively high pressure source are respectively connected to the interior and exterior of the sac of one of said containers and the inlet branch and the low pressure source are respectively connected to the interior and exterior of the sac of the other of said containers; a third fluid tight rigid container having a third flexible fluid tight sac attached inside said container and isolated therefrom for holding a supplementary supply of driven fluid, means for connecting said third container to a source of driving fluid at a pressure higher than said relatively high pressure; means for connecting said third fluid tight sac to said second fluid switching means; a fourth fluid tight rigid container; a fourth flexible fluid tight sac attached inside said fourth rigid container and isolated therefrom; means for connecting said fourth container to a source of driving fluid at a pressure lower than said relatively low pressure; and means for connecting said fourth sac to said second fluid switching means whereby driven fluid is added to said transport system from said third sac and driven fluid is withdrawn from said transport system into said fourth sac.

6. The fluid transport system according to claim 5 wherein said means connecting said third sac to said second fluid switching means includes valving means for controlling the flow therethrough and said means connecting said fourth sac to said second fluid switching means includes valve means for controlling the flow of fluid therethrough.

References Cited by the Examiner

UNITED STATES PATENTS

| | | | |
|---|---|---|---|
| 2,310,051 | 2/1943 | Baer | 137—564.5 |
| 2,618,510 | 11/1952 | Mills | 137—564.5 |
| 3,100,965 | 8/1963 | Blackburn | 91—4 X |

FOREIGN PATENTS 61,974  12/1923  Sweden.

M. CARY NELSON, *Primary Examiner.*